(12) United States Patent
Carter et al.

(10) Patent No.: US 9,158,505 B2
(45) Date of Patent: Oct. 13, 2015

(54) SPECIFYING COMPILED LANGUAGE CODE IN LINE WITH MARKUP LANGUAGE CODE

(71) Applicant: Microsoft Technology Licensing, LLC, Redmond, WA (US)

(72) Inventors: Benjamin F. Carter, Redmond, WA (US); Andrew M. Coates, Lynnwood, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/151,318

(22) Filed: Jan. 9, 2014

(65) Prior Publication Data
US 2015/0193209 A1 Jul. 9, 2015

(51) Int. Cl.
| | |
|---|---|
| G06F 17/00 | (2006.01) |
| G06F 17/20 | (2006.01) |
| G06F 17/24 | (2006.01) |
| G06F 17/28 | (2006.01) |
| G06F 9/44 | (2006.01) |
| G06F 9/45 | (2006.01) |

(52) U.S. Cl.
CPC ... *G06F 8/30* (2013.01); *G06F 8/41* (2013.01)

(58) Field of Classification Search
CPC .............. G06F 8/10; G06F 8/20; G06F 8/30; G06F 8/35; G06F 8/38; G06F 8/41; G06F 8/427; G06F 11/3664; G06F 17/2725; G06F 17/245; G06F 17/246; G06F 17/2247; G06F 17/2264; G06F 11/3624; G06F 11/3684
See application file for complete search history.

(56) References Cited

U.S. PATENT DOCUMENTS

| | | | |
|---|---|---|---|
| 6,327,702 B1 | 12/2001 | Sauntry et al. | |
| 6,799,718 B2 * | 10/2004 | Chan et al. | 717/141 |
| 6,836,883 B1 * | 12/2004 | Abrams et al. | 717/140 |
| 6,973,646 B1 | 12/2005 | Bordawekar et al. | |
| 6,986,101 B2 * | 1/2006 | Cooper et al. | 715/239 |
| 7,219,338 B2 | 5/2007 | Venter | |
| 8,402,427 B2 | 3/2013 | Chiang | |
| 8,943,474 B1 * | 1/2015 | Basumallik et al. | 717/114 |
| 2004/0172617 A1 * | 9/2004 | Ramani et al. | 717/114 |
| 2004/0194072 A1 * | 9/2004 | Venter | 717/140 |
| 2005/0108694 A1 * | 5/2005 | Ramani et al. | 717/143 |
| 2007/0006188 A1 * | 1/2007 | Schroth et al. | 717/140 |
| 2007/0300211 A1 * | 12/2007 | Reinhold | 717/140 |
| 2010/0131951 A1 * | 5/2010 | Carteri et al. | 717/140 |
| 2011/0271248 A1 * | 11/2011 | Simernitski | 717/108 |
| 2013/0024844 A1 * | 1/2013 | Bienkowski et al. | 717/125 |
| 2013/0205192 A1 * | 8/2013 | Spada et al. | 715/227 |

OTHER PUBLICATIONS

Greg J. Badros, JavaML: a markup language for Java source code, Department of Computer Science and Engineering, University of Washington, 2000, published by Elsevier [Retrieved on Dec. 13, 2014]. Retrieved from the internet: <URL: http://www.sciencedirect.com/science/article/pii/S1389128600000372> 19 Pages (159-177).*
Harren, et al., "XJ: Integration of XML Processing into Java", In Proceedings of the 13th International World Wide Web conference on Alternate Track Papers & Posters, May 17, 2004, 3 pages.

* cited by examiner

*Primary Examiner* — Don Wong
*Assistant Examiner* — Anibal Rivera
(74) *Attorney, Agent, or Firm* — Damon Rieth; Jim Ross; Micky Minhas (57) ABSTRACT

Compiled language code is specified in line with markup language code. A parsing component parses the code to extract the compiled language code and a compiler compiles it into binary form. The compiled code and the markup language code are provided to a runtime system.

18 Claims, 12 Drawing Sheets

SPECIFYING COMPILED LANGUAGE CODE IN LINE WITH MARKUP LANGUAGE CODE

BACKGROUND

Computer systems are currently in wide use. Computer systems often include user interface displays with user input mechanisms. A user interacts with the user-input mechanisms on the user interface displays to control or manipulate an underlying computer system or application.

Current user interface frameworks allow developers to specify code to run in a number of different ways. One way of specifying code to run is by using an interpreted script language that is specified in line with a user interface markup language, such as HTML. Another way of specifying code to run is by using a native compiled code language that is specified separately from the user interface markup language.

Both of these frameworks have disadvantages. The interpreted script language is often interpreted at runtime on a client machine. However, this type of runtime interpretation uses processing overhead and increases memory usage. The native compiled language code is separated from the user interface markup code. Therefore, a developer normally needs to maintain a mental memory of where that code exists, in order to update or change that code. For instance, if a developer were to change a button on a UI element, the developer may also wish to update the code that the UI element triggers. If that code exists in another file, the developer needs to remember where that file exists, and switch to it to perform the update.

The discussion above is merely provided for general background information and is not intended to be used as an aid in determining the scope of the claimed subject matter.

SUMMARY

Compiled language code is specified in line with markup language code. A parsing component parses the code to extract the compiled language code and a compiler compiles it into binary form. The compiled code and the markup language code are provided to a runtime system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
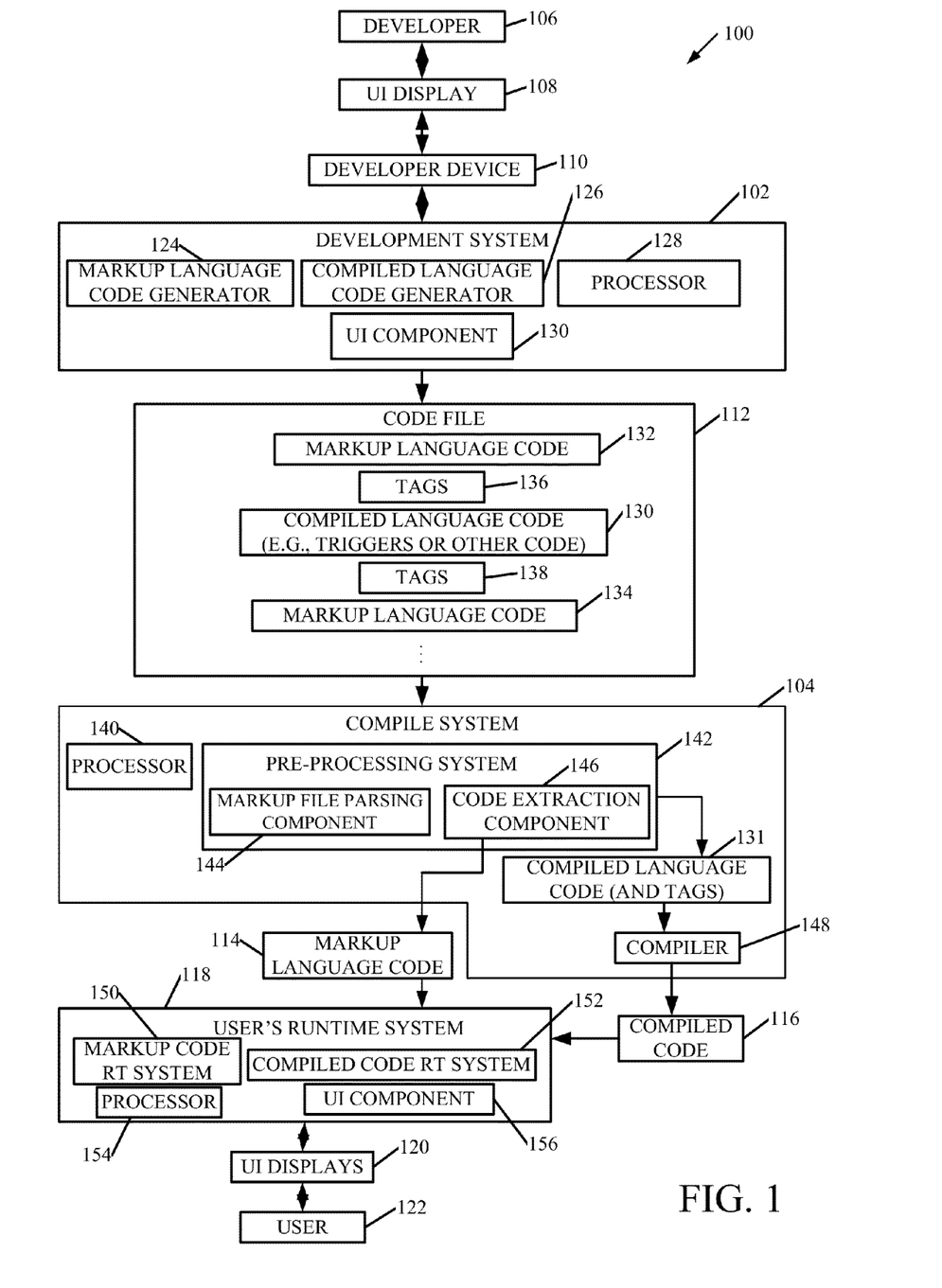
FIG. 1 is a block diagram of one illustrative development architecture.

FIG. 1 shows one embodiment of a development architecture 100. Development architecture 100 includes development system 102 and compile system 104. Development architecture 100 also shows that a developer 106 can access development system 102 by interacting with user interface displays 108 generated on a developer device 110. FIG. 1 also shows that development system 102 illustratively outputs a code file 112 that is received by compile system 104. Compile system 104, itself, outputs markup language code 114 and compiled code 116. A user's runtime system 118 receives code 114 and 116 and runs it. In doing so, runtime system 118 illustratively generates user interface displays 120 that can be interacted with by user 122.

FIG. 1 further shows that development system 102 illustratively includes markup language code generator 124, compiled language code generator 126, processor 128 and user interface (UI) component 130. FIG. 1 also shows that code file 112 illustratively includes a number of items. In the embodiment shown in FIG. 1, code file 112 illustratively includes compiled language code 130 interspersed between a number of markup language code sections 132 and 134. Compiled language code 130 is illustratively identified in code file 112 by a set of tags 136 and 138. Code file 112 is described in greater detail below.

Compile system 104 illustratively includes processor 140, pre-processing system 142 (which, itself, includes markup file parsing component 144 and code extraction component 146), and compiler 148. The user's runtime system 118 illustratively includes markup code runtime system 150 and compiled code runtime system 152, as well as processor 154 and user interface component 156.

Before describing the operation of architecture 100 in more detail, a brief overview will be provided to enhance understanding. A developer uses markup language code generator (which can also be a text editor or another component) 124 to generate markup language code that can be used, for instance, to define a user interface. Developer 106 illustratively uses compiled language code generator 126 to generate compiled code. Code generators 124 and 126 can be the same code generator or separate code generators. They are described as separate code generators for the sake of example only. The compiled code can, for instance, specify some of the functionality of the user interface defined by the markup language code.

In one embodiment, developer 106 generates code file 112 which specifies the compiled language code 130 in line with the markup language code 132 and 134. The compiled language code 130 is illustratively identified in code file 112 by a set of tags or other identifiers 136 and 138.

Code file 112 is received by compile system 104 where pre-processing system 142 extracts the markup language code sections 132 and 134 and provides them in markup language code 114. It also extracts the compiled language code 130 and provides it to compiler 148. Compiler 148 compiles code 130 to obtain compiled code 116. The markup language code 114 and the compiled code 116 are then sent to the user's runtime system 118. Markup code runtime system 150 runs the markup language code 114 and compiled code runtime system 152 (which can also be a processor, a virtual machine, a managed runtime or other) runs compiled code 116. By way of example, markup code runtime system 150 may read or interpret or even compile the markup code 114, while compiled code runtime system 152 runs compiled code 116. Of course, these are examples only.

Figure 2:
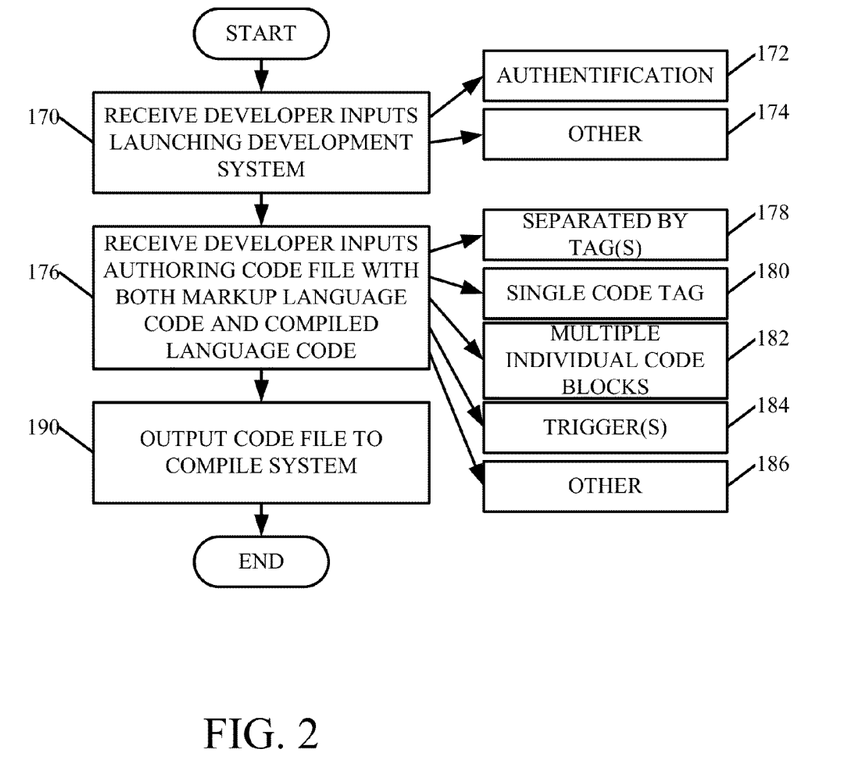
FIG. 2 is a flow diagram illustrating one embodiment of the architecture shown in FIG. 1 in generating a code file.

One embodiment of the operation of architecture 100 will now be described in more detail. FIG. 2 is a flow diagram illustrating one embodiment of the overall operation of development system 102 in more detail. Development system 102 first receives developer inputs (such as through UI displays 108) from developer 106 that indicate that developer 106 wishes to launch development system 102. Receiving the developer inputs to launch the development system is indicated by block 170 in FIG. 2. The developer inputs can include authentication information 172, such as a username and password. It can also include other inputs 174 as well.

Development system 102 then receives developer inputs authoring code file 112. The code file 112 illustratively includes both markup language code and compiled language code. Receiving the developer inputs to generate code file 112 is indicated by block 176 in FIG. 2. In one embodiment, markup language code generator 124 receives markup language code inputs to develop the markup language code sections 132 and 134. Compiled language code generator 126 receives inputs to generate the compiled language code 130. In one embodiment, the compiled language code 130 is separated from the markup language code sections 132 and 134 by a tag or a series of tags. This is indicated by block 178 in FIG. 2.

By way of example, the schema used to identify the compiled language code sections 130 can be a single tag called "code" in which all of the code blocks are specified. A single code tag is indicated by block 180 in FIG. 2. In another embodiment, the schema can be more granular, where individual compiled language code blocks are specified with the name "script". The code blocks can also allow for the specification of other parameters, such as when the block should be run. Having multiple individual code blocks is indicated by block 182, and allowing the schema to specify triggers indicating when the code block should be run is indicated by block 184. It will be noted, of course, that the names "code" and "script" are exemplary only and a wide variety of other names and other schemas can be used as well. This is indicated by block 186.

Table 1 shows one example of a user interface markup file that not only includes markup language code, but that also specifies a compiled code section, and the trigger that is used to indicate when the compiled code section should be run.

TABLE 1

```
<UserControl>
    <o:Properties>
        <o:Property Type="String" Name="Line1"/>
    </o:Properties>
    <o:Scripts>
        <o:Script Trigger=".ctor Line1">
            Line1Element->Text = Line1;
        </o:Script>
    </o:Scripts>
    <Border BorderThickness="2">
        <TextBlock x:Name="Line1Element"/>
    </Border>
</UserControl>
```

It can be seen that the first part of the code file shown in Table 1 indicates that the code file is for a user control, and specifies properties for the user control. The last part of the code file shown in Table 1 specifies a border thickness for the user control. A center part of the code file shown in Table 1 (the portion separated by, and including, the "scripts" tags) indicates a compiled code section that is to be called, and when it is to be called. Of course, the tags shown in Table 1 are exemplary only, and the compiled code sections can be defined in the schema in other ways as well, so long as they can be distinguished from other tags (e.g., the native tags) of the user interface framework.

The markup and code specified by the developer (such as that shown in Table 1) corresponds to a set of actual code that is to be compiled. The corresponding actual code can take many different forms. Table 2 shows one embodiment of a set of code that is generated in a compiled language.

TABLE 2

```
void OnScriptInit( )
{
    Script_Ctor_Line1_Changed( );
}
property Platform::String^ Line1
{
    Platform::String^ get( ) { return m_Line1; }
    void set(Platform::String value)
    {
        if (m_Line1->Equals(value))
            return;
        m_Line1 = value;
        Xaml::NotifyPropertyChanged(*this, propidLine1( ));
        m_Script_Ctor_Line1_Changed->Dirty( );
    }
}
Xaml::Script m_Script_Ctor_Line1_Changed(this,
Script_Ctor_Line1_Changed);
void Script_Ctor_Line1_Changed( )
{
    Line1Element->Text = Line1;
}
```

Thus, the code shown in Table 2 can be compiled into native machine code using an available compiler for the compliable language in which it is authored. The code file including both the markup language code and the compiled language code are then output to compile system 104. This is indicated by block 190 in the flow diagram of FIG. 2.

Figure 3:
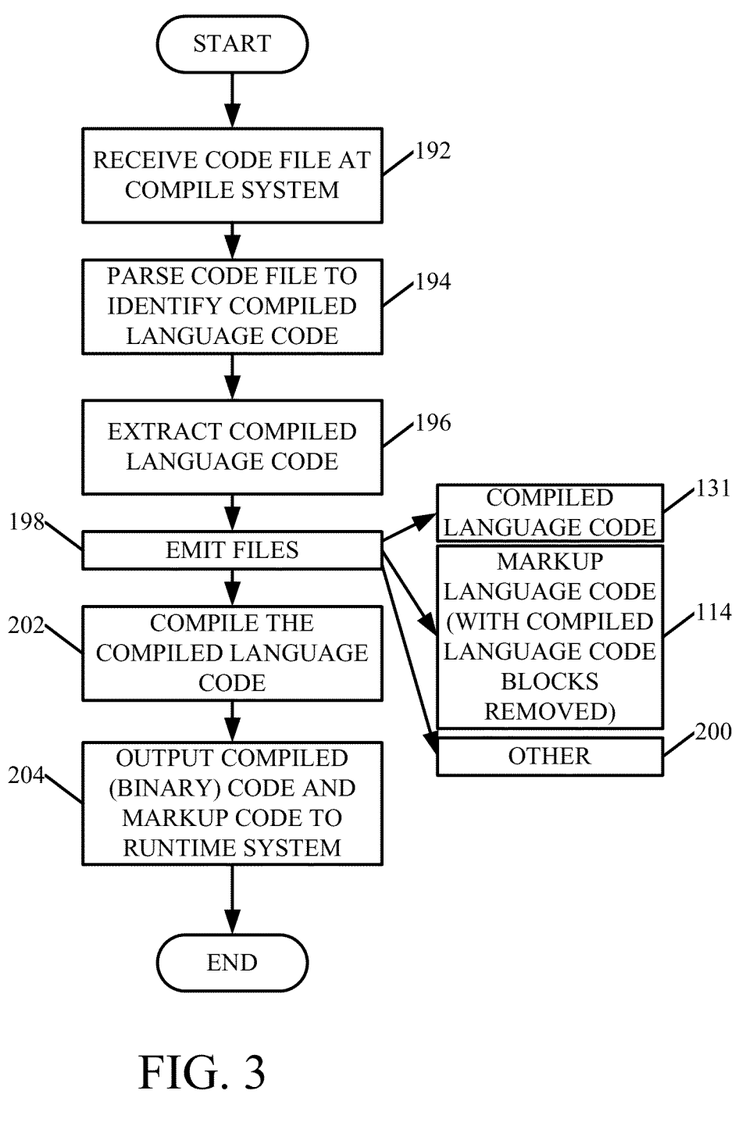
FIG. 3 is a flow diagram illustrating one embodiment of the operation of the architecture shown in FIG. 1 in compiling the code file.

FIG. 3 shows one embodiment of the operation of compile system 104, in more detail. Compile system 104 first illustratively receives code file 112. This is indicated by block 192. In one embodiment, code file 112 is provided to pre-processing system 142. Markup file parsing component 144 reads the code file 112 and parses the code file to identify the compiled language code 130. specified within code file 112 in line with the markup code. Parsing the code is indicated by block 194 in FIG. 3. This can be done, for instance, by reading code file 112 and identifying tags 136 and 138 which, themselves identify the compiled language code section 130.

Code extraction component 146 then extracts the compiled language code 130 (and illustratively tags 136 and 138) into compiled language code 131. Extracting the compiled language code (and tags) is indicated by block 196.

Pre-processing system 142 then emits one or more files. The emitted files can include the generated code blocks of compiled language blocks (and tags) 131. They can also include separate markup language code 114 (which includes the markup language code sections 132 and 134) rewritten without the compiled language code 130 and tags 136 and 138. Emitting the files is indicated by block 198 in the flow diagram of FIG. 3. Emitting the files can be done in other ways as well, as indicated by block 200.

The compiled language code 131 and markup language code 114 can then be output to one or more compilers that are used to compile that code. In the example discussed with respect to FIG. 3, compiled language code 131 is provided to compiler 148 which compiles the code into compiled code 116. Compiling the code is indicated by block 202 in the flow diagram of FIG. 3. The compiled (e.g., binary) code and the markup language code are then output to runtime system 118. This is indicated by block 204 in FIG. 3.

It should be noted that, in one embodiment, the code that has been compiled is called by some other part of the application represented by code file 112. In one exemplary embodiment, the developer 106 writes the code that invokes the compiled code 116. In another embodiment, developer 106 provides a notification to a component that an event has occurred, and that component calls the appropriate compiled code 116. Of course, these are exemplary embodiments only.

Figure 4:
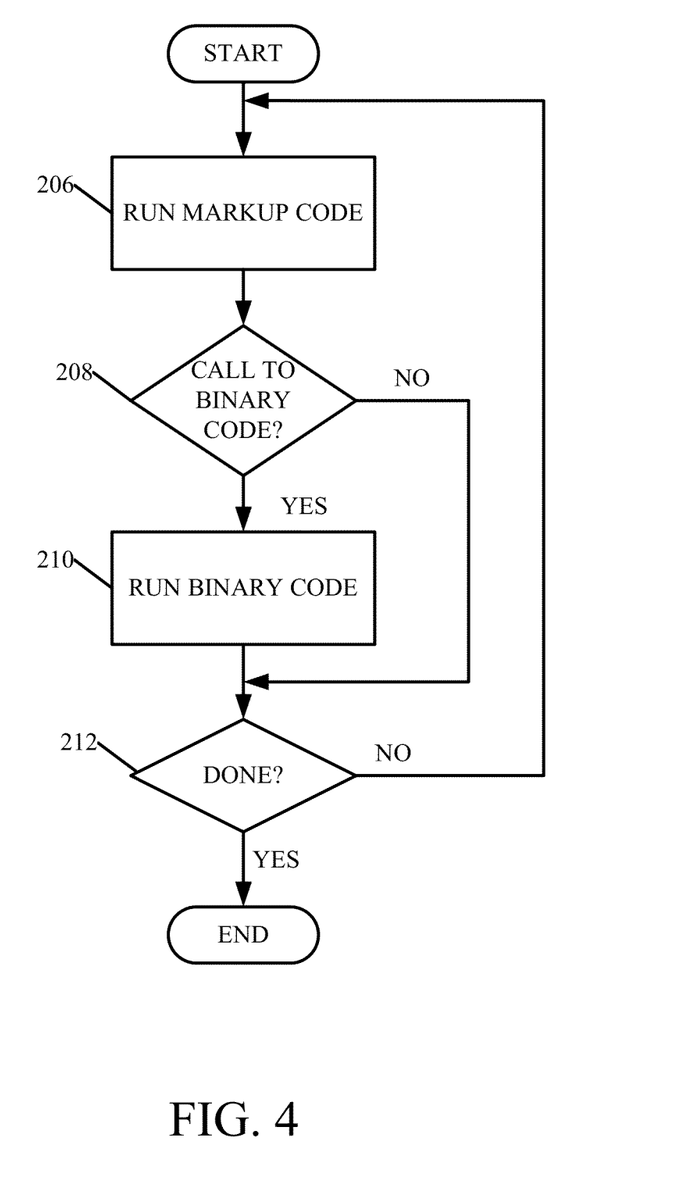
FIG. 4 is a flow diagram illustrating one embodiment of the operation of the architecture shown in FIG. 1 in running the code.

FIG. 4 shows one embodiment of the operation of runtime system 118. In one embodiment, runtime system 118 starts by beginning to run the markup language code 114. This can be compiled at runtime, interpreted at runtime, or it can be run in other ways. Running the markup code is indicated by block 206. At some point, a trigger will be reached which calls the binary (or compiled) code. When this occurs, the compiled code is run. This is indicated by block 208 and 210 in FIG. 4. This continues until the code has been run and operation is complete, as indicated by block 212.

Figure 5:
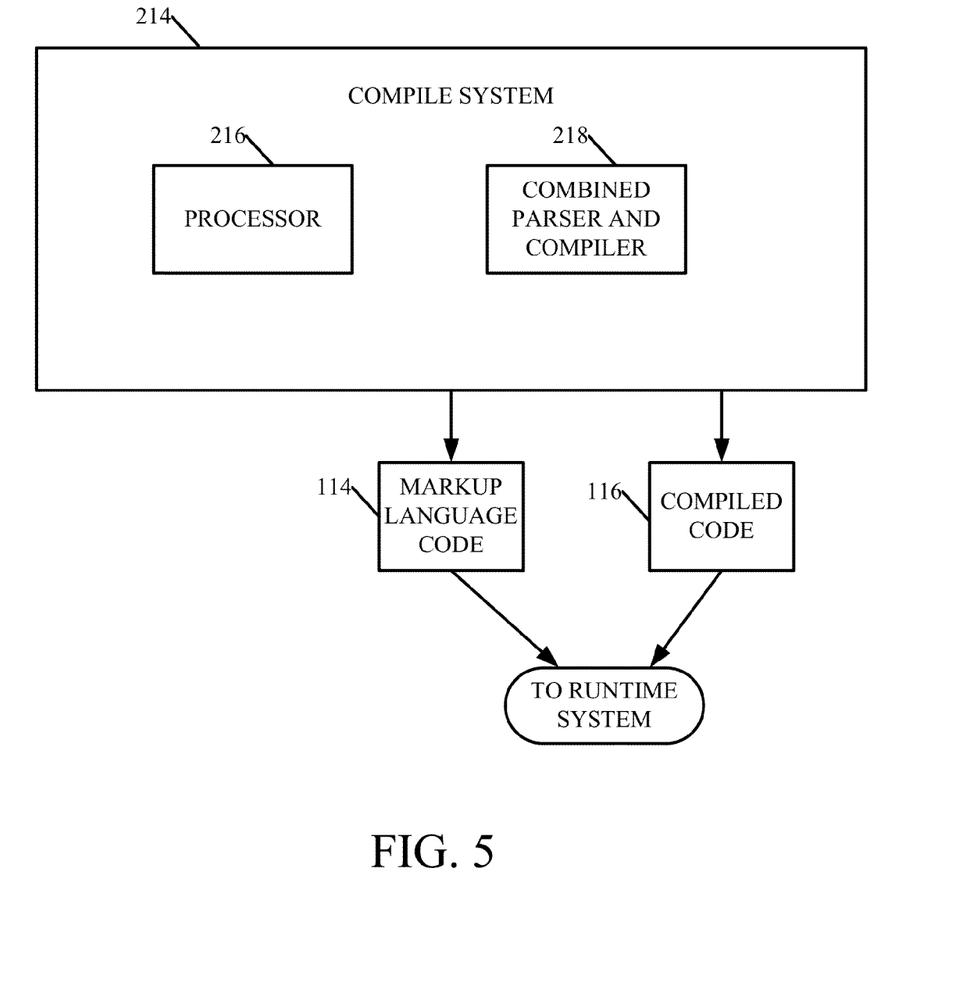
FIG. 5 is a block diagram of another embodiment of a compile system.

FIG. 5 shows a block diagram of another embodiment of a compile system 214, that can be used with code file 112. In the embodiment shown in FIG. 5, compile system 214 includes processor 216 and combined parser and compiler 218. Combined parser and compiler 218 illustratively understands the schema with which the compiled language code 130 is identified in code file 112. It is also illustratively capable of compiling code 130 as well. Thus, pre-processing system 142 (which separates the compiled language code from the markup language code) need not be used. Instead, combined parser and compiler 218 can, itself, parse out the compiled code, and compile it, and also output the markup language code as well, to runtime system 118. This is but one exemplary embodiment.

It can thus be seen that the present discussion allows developers to write code in a native compiled language within a user interface markup file. Blocks of the compiled language code can be specified within specific XML (or other) tags. These blocks of code are processed at compile time into native machine code, while leaving the user interface markup intact for consumption by the user interface runtime framework. When an application is run, events (such as property changes) can trigger calls to the compiled native code to achieve the desired outcome of the developer.

The present discussion has mentioned processors and/or servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 6:
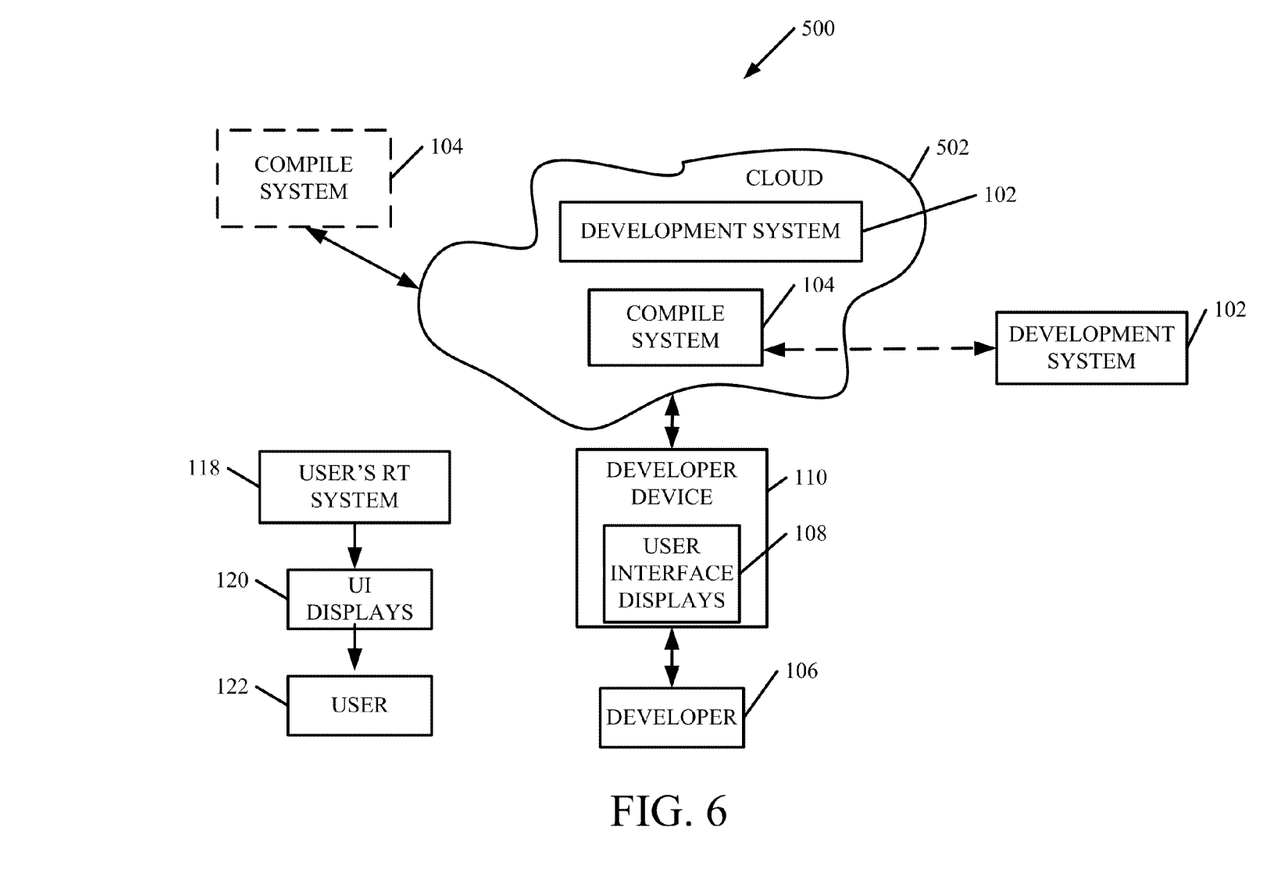
FIG. 6 shows one embodiment of the architecture shown in FIG. 1, deployed in a cloud computing architecture.

FIG. 6 is a block diagram of architecture 100, shown in FIG. 1, except that it elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the embodiment shown in FIG. 6, some items are similar to those shown in FIG. 1 and they are similarly numbered. FIG. 4 specifically shows that development system 102 and/or compile system 104 can be located in cloud 502 (which can be public, private, or a combination where portions are public while others are private). Therefore, developer 106 uses a developer device 110 to access those systems through cloud 502.

FIG. 6 also depicts another embodiment of a cloud architecture. FIG. 4 shows that it is also contemplated that some elements of architecture 100 can be disposed in cloud 502 while others are not. By way of example, development system 102 can be disposed outside of cloud 502, and accessed through cloud 502. In another embodiment, compile system 104 is also outside of cloud 502. Regardless of where they are located, they can be accessed directly by device 110, through a network (either a wide area network or a local area network), they can be hosted at a remote site by a service, or they can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 7:
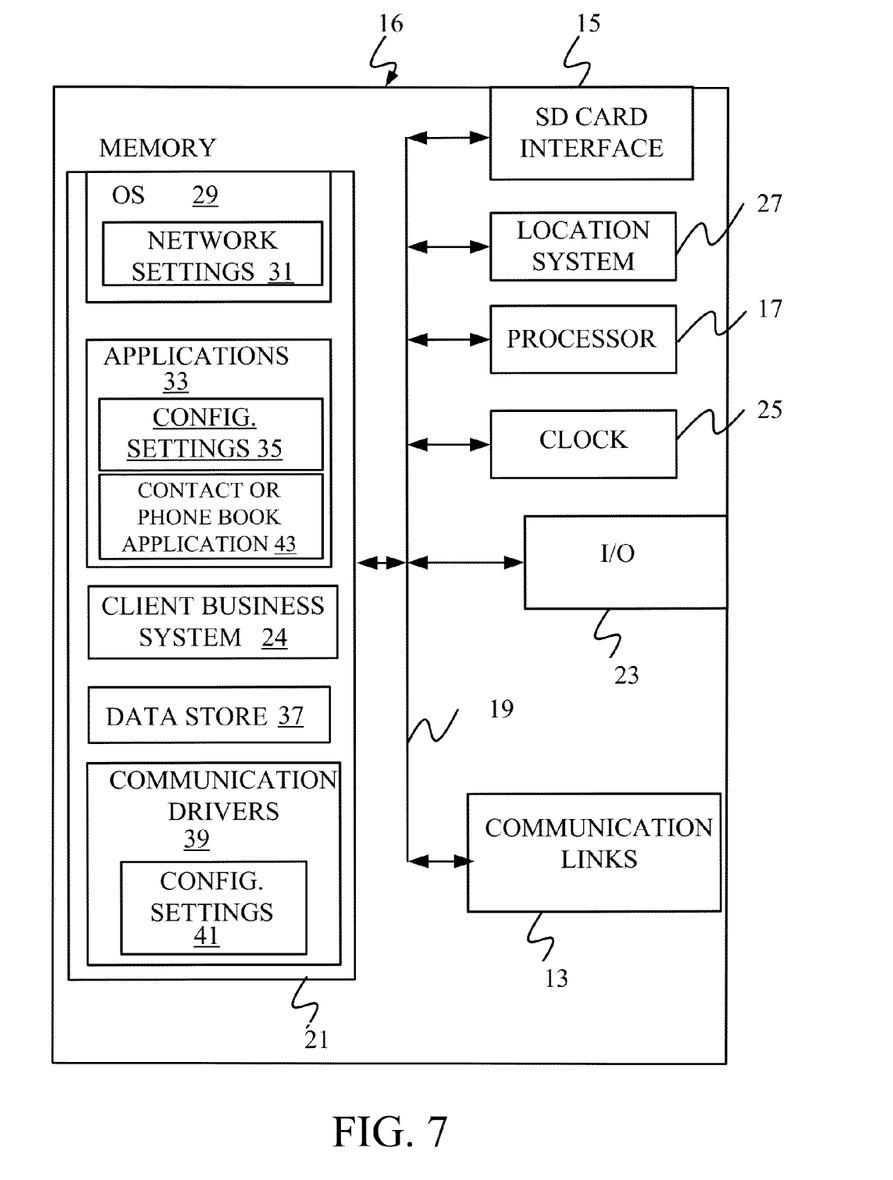
FIGS. 7-11 show various embodiments of mobile devices.

FIG. 7 is a simplified block diagram of one illustrative embodiment of a handheld or mobile computing device that can be used as a user's or client's hand held device 16 (and which can run the user's runtime system 118, for instance), in which the present system (or parts of it) can be deployed. FIGS. 8-11 are examples of handheld or mobile devices.

Figure 8:
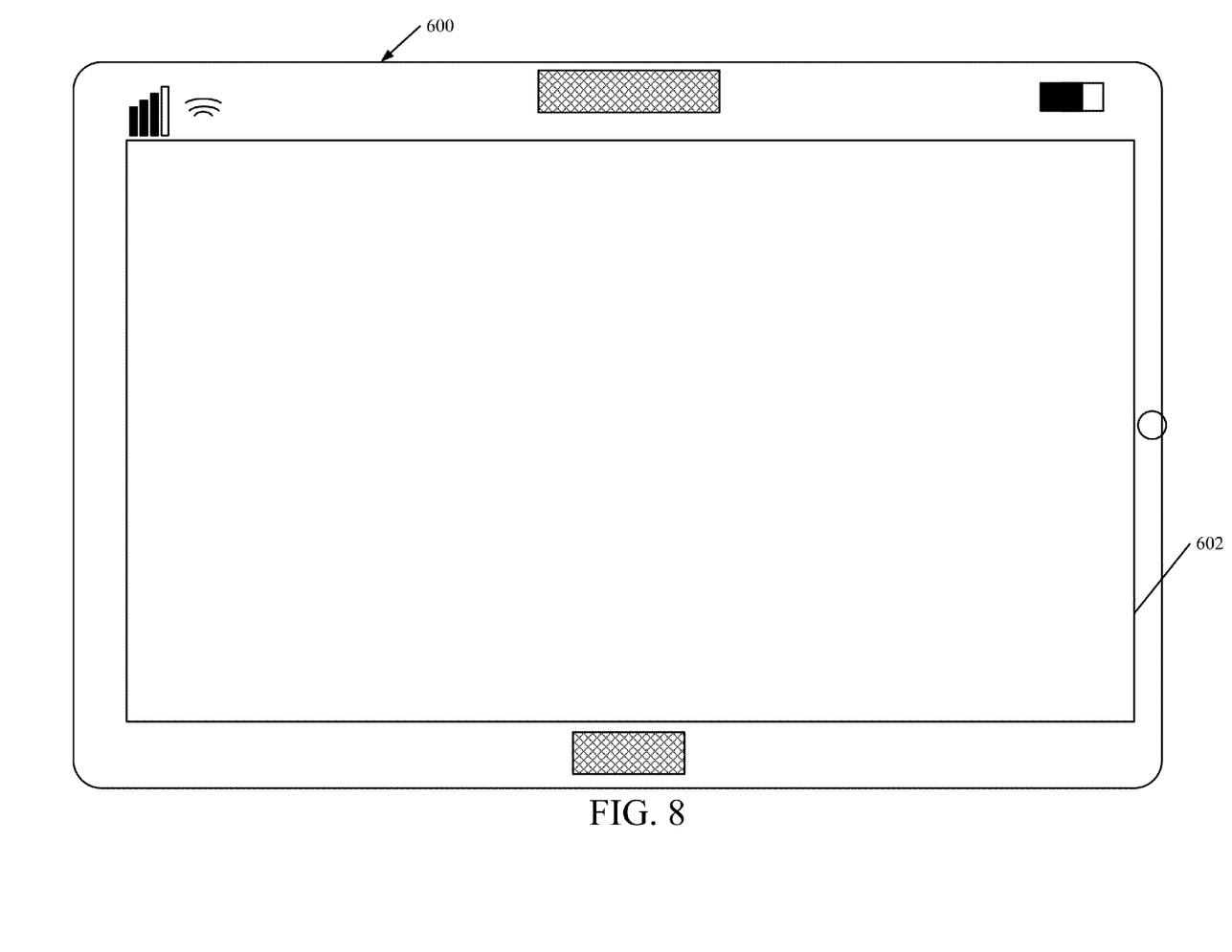

FIG. 8 provides a general block diagram of the components of a client device 16 that can run components of architecture 100 or runtime or system 118 or that interacts with architecture 100, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1Xrtt, and Short Message Service, which are wireless services used to provide cellular access to a network, as well as 802.11 and 802.11b (Wi-Fi) protocols, and Bluetooth protocol, which provide local wireless connections to networks.

Under other embodiments, applications or systems are received on a removable Secure Digital (SD) card that is connected to a SD card interface 15. SD card interface 15 and communication links 13 communicate with a processor 17 (which can also embody processors 128, 140 or 154 from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 8 shows one embodiment in which device 16 is a tablet computer 600. In FIG. 6, computer 600 is shown with user interface display screen 602. Screen 602 can be a touch screen (so touch gestures from a user's finger 604 can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 9:
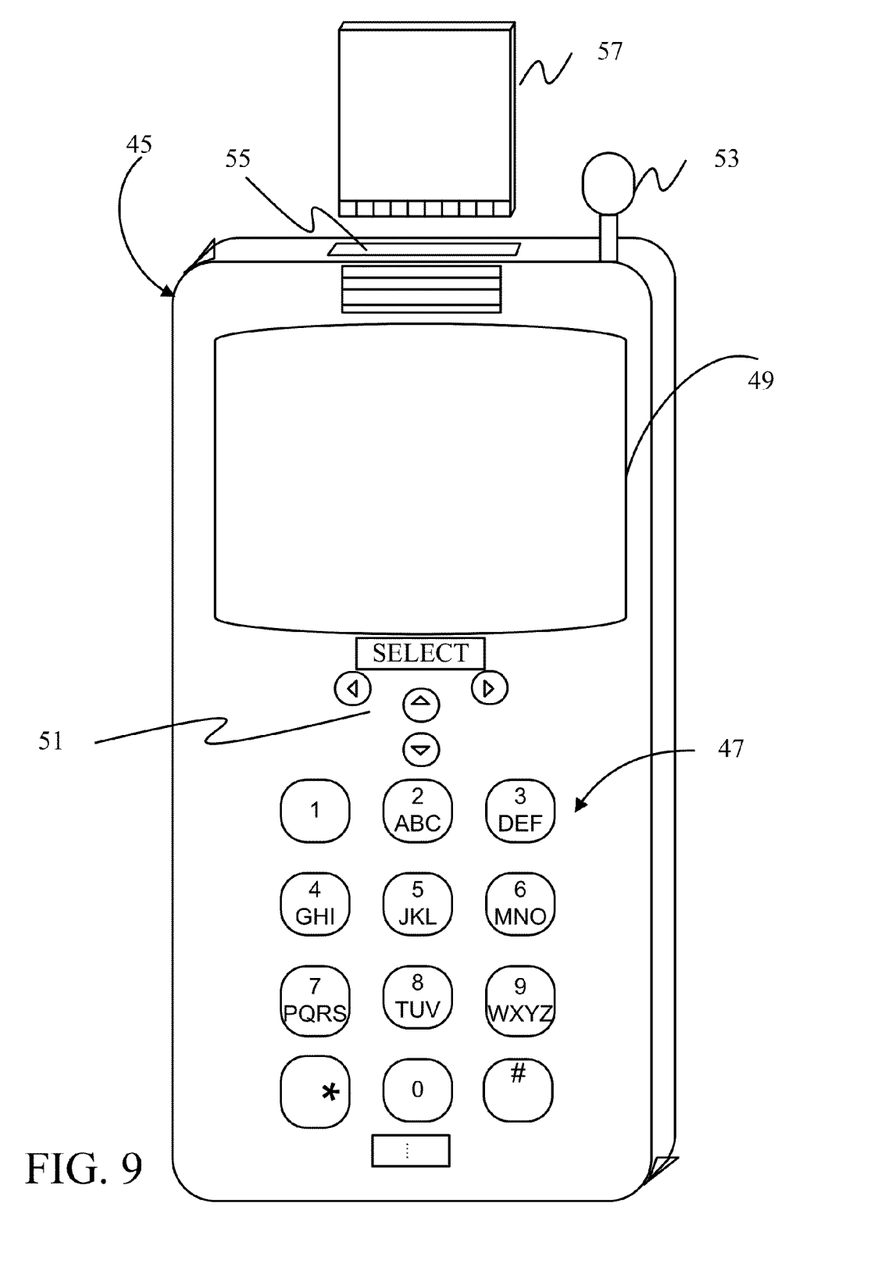
Figure 10:
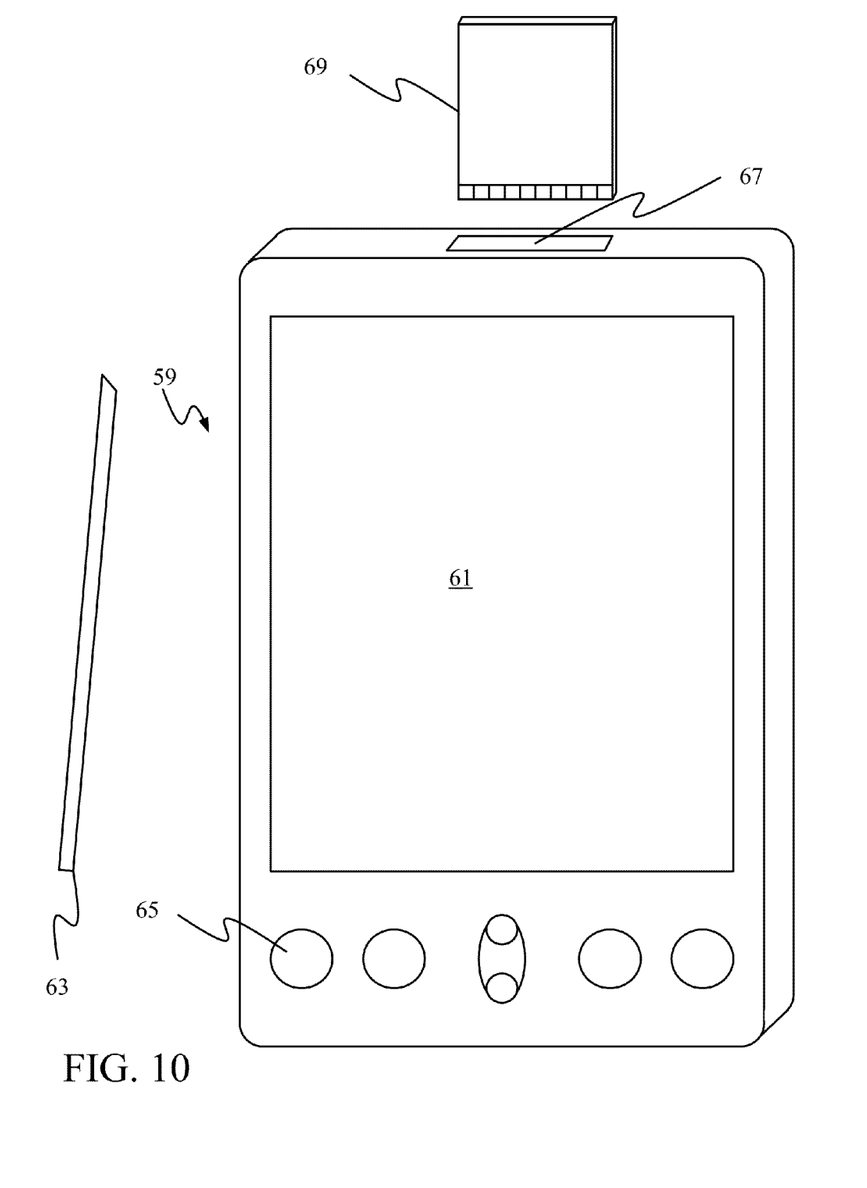

FIGS. 9 and 10 provide additional examples of devices 16 that can be used, although others can be used as well. In FIG. 9, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals such as General Packet Radio Service (GPRS) and 1Xrtt, and Short Message Service (SMS) signals. In some embodiments, phone 45 also includes a Secure Digital (SD) card slot 55 that accepts a SD card 57.

The mobile device of FIG. 10 is a personal digital assistant (PDA) 59 or a multimedia player or a tablet computing device, etc. (hereinafter referred to as PDA 59). PDA 59 includes an inductive screen 61 that senses the position of a stylus 63 (or other pointers, such as a user's finger) when the stylus is positioned over the screen. This allows the user to select, highlight, and move items on the screen as well as draw and write. PDA 59 also includes a number of user input keys or buttons (such as button 65) which allow the user to scroll through menu options or other display options which are displayed on display 61, and allow the user to change applications or select user input functions, without contacting display 61. Although not shown, PDA 59 can include an internal antenna and an infrared transmitter/receiver that allow for wireless communication with other computers as well as connection ports that allow for hardware connections to other computing devices. Such hardware connections are typically made through a cradle that connects to the other computer through a serial or USB port. As such, these connections are non-network connections. In one embodiment, mobile device 59 also includes a SD card slot 67 that accepts a SD card 69.

Figure 11:
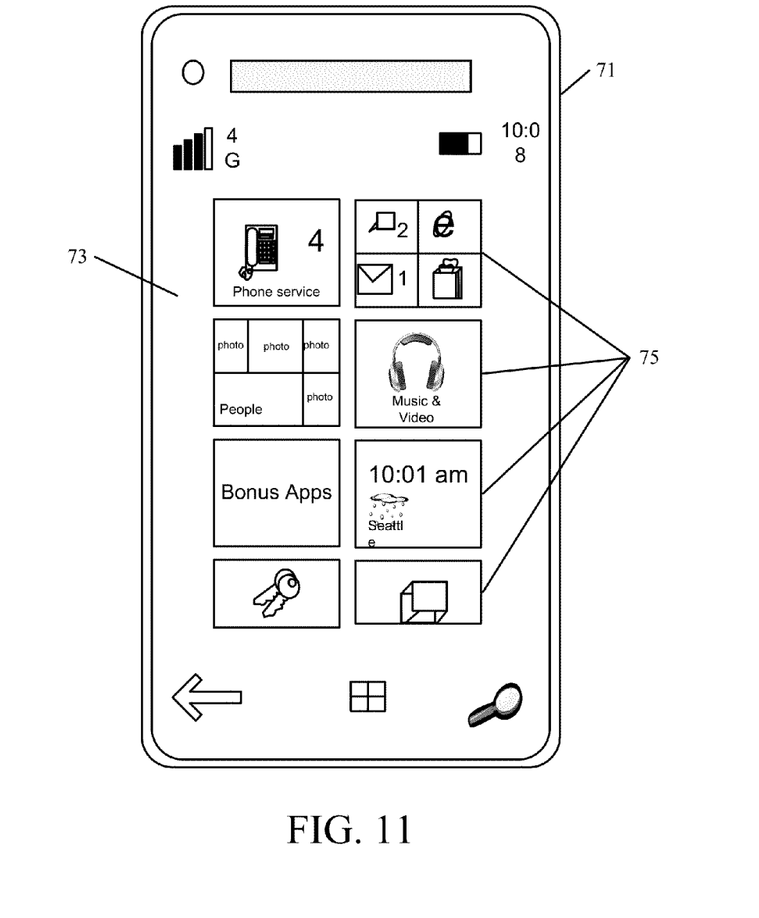

FIG. 11 is similar to FIG. 9 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 12:
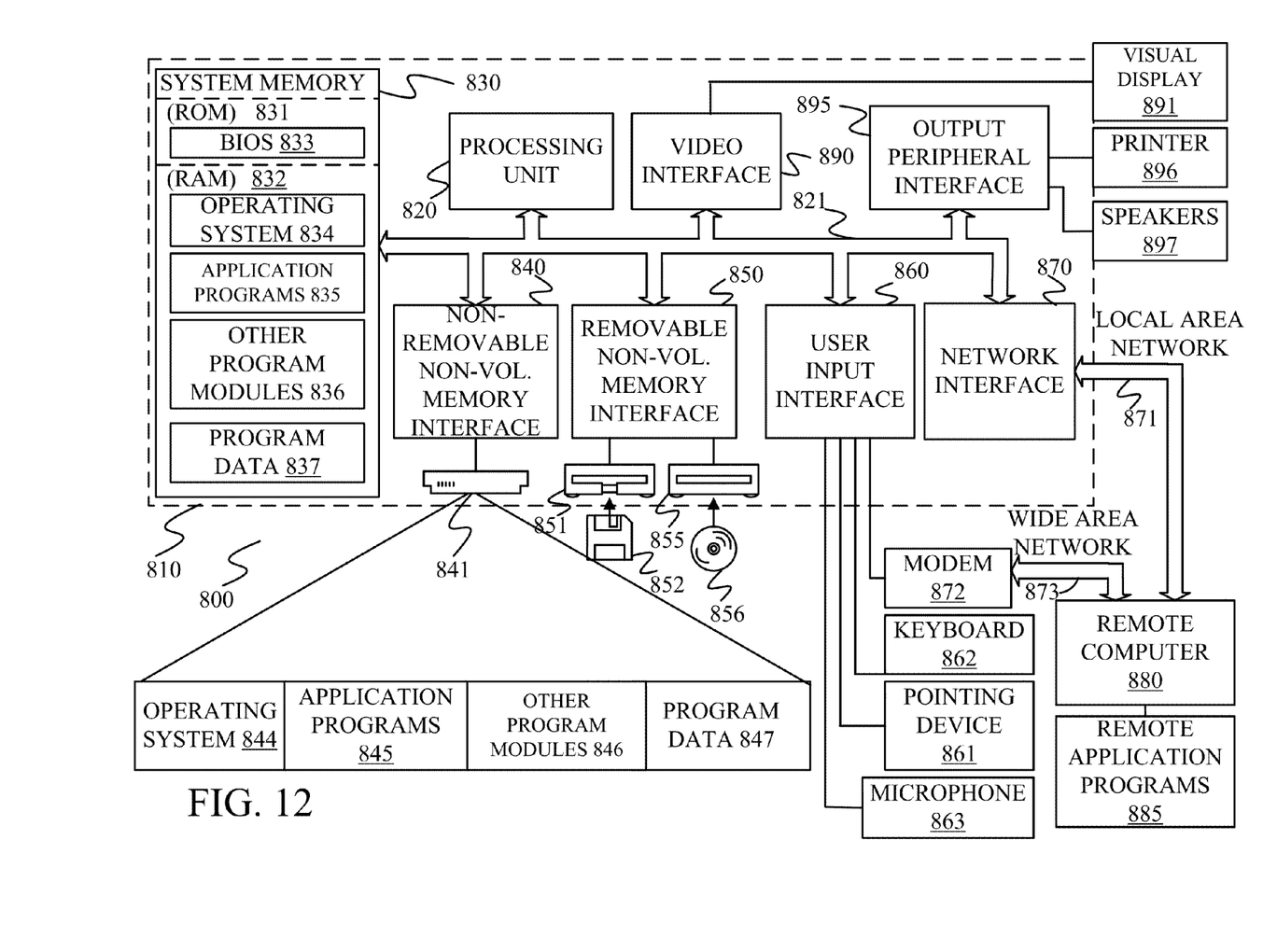
FIG. 12 shows one embodiment of a computing environment.

FIG. 12 is one embodiment of a computing environment in which architecture 100, or parts of it, (for example) can be deployed. With reference to FIG. 12, an exemplary system for implementing some embodiments includes a general-purpose computing device in the form of a computer 810. Components of computer 810 may include, but are not limited to, a processing unit 820 (which can comprise processor 128, 140 or 154), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 12.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 12 illustrates operating system 834, application programs 835, other program modules 836, and program data 837.

The computer 810 may also include other removable/non-removable volatile/nonvolatile computer storage media. By way of example only, FIG. 12 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 12, provide storage of computer readable instructions, data structures, program modules and other data for the computer 810. In FIG. 12, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 12 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 10 illustrates remote application programs 885 as residing on remote computer 880. It will be appreciated that the network connections shown are exemplary and other means of establishing a communications link between the computers may be used.

It should also be noted that the different embodiments described herein can be combined in different ways. That is, parts of one or more embodiments can be combined with parts of one or more other embodiments. All of this is contemplated herein.

What is claimed:

1. A computer-implemented method, comprising:
receiving first developer inputs authoring markup language code in a user interface (UI) markup file;
receiving second developer inputs authoring a compiled language code section in line with the markup language code in the UI markup file, the compiled language code section comprising compiled language code to be compiled by a compile system and being delineated from the markup language code by a set of compiled language code identifiers, the compiled language code identifiers identifying the compiled language code section;
generating the UI markup file with the markup language code and the compiled language code section in line with the markup language code and delineated from the markup language code by the compiled language code identifiers, in response to the first and second developer inputs; and
outputting the UI markup file for compiling of the compiled language code at the compile system.

2. The computer-implemented method of claim 1 wherein generating the UI markup file further comprises:
generating the UI markup file with the set of compiled language code identifiers comprising at least one tag that marks a beginning or an end of the compiled language code section.

3. The computer-implemented method of claim 1 wherein generating the UI markup file further comprises:
generating the UI markup file with the set of compiled language code identifiers each comprising a series of tags that mark a beginning and an end of the compiled language code section.

4. The computer-implemented method of claim 1 wherein generating the UI markup file comprises:
generating the compiled language code section as a single section that includes all of the compiled language code in the UI markup file.

5. The computer-implemented method of claim 1 wherein generating the UI markup file comprises:
generating a plurality of different compiled language code sections, each delineated by a corresponding set of compiled language code identifiers.

6. The computer-implemented method of claim 5 wherein generating each of the plurality of compiled language code sections comprises:
generating a trigger in a corresponding compiled language code section, the trigger defining when the corresponding compiled language code section is called by an application using the UI markup file.

7. The computer-implemented method of claim 1 and further comprising:
parsing the UI markup file to identify the compiled language code section for a compiler; and
compiling the compiled language code section to obtain compiled code.

8. The computer-implemented method of claim 7 and further comprising:
outputting the markup language code from the UI markup file and the compiled code for use by a runtime system.

9. The computer-implemented method of claim 8 wherein parsing comprises:
preprocessing the UI markup file to separate the compiled language code section from the markup language code; and
re-writing the UI markup file without the compiled language code section.

10. A development architecture, comprising:
a UI markup file that has markup language code and a compiled language code section that includes compiled language code in line with the markup language code, wherein a set of tags in the UI markup file identify a beginning of the compiled language code section and an end of the compiled language code section;
a parsing component that receives the UI markup file and that parses the UI markup file to identify the compiled language code based on the set of tags in the UI markup file;
a compiler that receives the compiled language code, identified by the parsing component, from the UI markup tile and compiles the compiled language code to obtain compiled code, wherein the markup language code and the compiled code are outputted for use by a runtime system; and
a computer processor that is a functional part of the architecture and is activated by the parsing component and the compiler to facilitate identifying the compiled language code in the UI markup file and compiling.

11. The development architecture of claim 10 and further comprising:
a code extraction component that extracts the compiled language code identified by the parsing component and provides it to the compiler.

12. The development architecture of claim 11 wherein the parsing component identifies, in the UI markup file, a plurality of different compiled language code sections, each marked in the UI markup file by a corresponding set of tags.

13. The development architecture of claim 12 wherein the parsing component identifies, in the UI markup file, a plurality of different compiled language code section triggers, each compiled language code section trigger identifying when a corresponding compiled language code section is to be run.

14. The development architecture of claim 10, and further comprising:
a development system that receives developer inputs and generates the UI markup file based on the developer inputs.

15. A computer readable hardware storage medium that stores computer executable instructions which, when executed by a computer, cause the computer to perform a method, comprising:
generating a developer user interface that displays one or more developer user interface displays;

receiving developer inputs, through the developer user interface, that author markup language code and compiled language code in line with the markup language code;

generating a UI markup file that has the markup language code and the compiled language code in line with the markup language code, the UI markup file having a set of tags that delineate the compiled language code from the markup language code;

identifying the compiled language code by identifying the set of tags in the UI markup file;

compiling the compiled language code identified, to obtain compiled code; and outputting the markup language code and the compiled code, respectively, for use by a runtime system.

16. The computer readable storage medium of claim 15 wherein identifying the compiled language code in the UI markup file comprises:

identifying a first set of tags in the UI markup tile that identifies a beginning of a compiled language code section that includes the compiled language code; and identifying a second set of tags in the UI markup file that identifies an end of the compiled language code section in the UI markup file.

17. The computer readable storage medium of claim 16 and further comprising:

extracting the compiled language code identified in the UI markup file; and providing it to a compiler that performs the compiling.

18. The computer readable storage medium of claim 16 wherein identifying the compiled code in the UI markup file, comprises:

identifying a plurality of different compiled language code sections, each marked in the UI markup file by a corresponding set of tags; and identifying a plurality of different compiled language code section triggers, each compiled language code section trigger identifying when a corresponding compiled language code section is to be run.

* * * * *